United States Patent [19]
Fujieda

[11] Patent Number: 6,055,324
[45] Date of Patent: Apr. 25, 2000

[54] FINGERPRINT IMAGE ENTRY DEVICE OF ELECTROSTATIC CAPACITANCE SENSING TYPE

[75] Inventor: Ichiro Fujieda, Tokyo, Japan

[73] Assignee: NEC Corporation, Tokyo, Japan

[21] Appl. No.: 09/103,502

[22] Filed: Jun. 24, 1998

[30] Foreign Application Priority Data

Jun. 30, 1997 [JP] Japan .................................. 9-189246

[51] Int. Cl.[7] ..................................................... G06K 9/28
[52] U.S. Cl. ............................................ 382/124; 382/312
[58] Field of Search ................................... 382/124–127, 382/312, 108, 319, 318, 315; 340/825.34; 356/71

[56] References Cited

U.S. PATENT DOCUMENTS

| | | | |
|---|---|---|---|
| 4,290,052 | 9/1981 | Eichelberger et al. | 340/365 |
| 4,353,056 | 10/1982 | Tsikos | 340/146.3 |
| 5,325,442 | 6/1994 | Knapp | 382/4 |
| 5,550,659 | 8/1996 | Fujieda et al. | 359/54 |
| 5,635,723 | 6/1997 | Fujieda et al. | 250/556 |
| 5,907,627 | 5/1999 | Borza | 382/124 |
| 5,963,679 | 10/1999 | Setlak | 382/312 |
| 5,987,156 | 11/1999 | Ackland et al. | 382/125 |

FOREIGN PATENT DOCUMENTS 8-305832  11/1996  Japan ............................... G06T 1/00

OTHER PUBLICATIONS

N. D. Yong et al, Novel Fingerprint Scanning Arrays Using Polysilicon TFT's on Glass and Polymer Substrates, IEEE Electron Device Letters, vol. 18, No. 1. pp. 19–20, Jan. 1997.

Primary Examiner—Leo H. Boudreau
Assistant Examiner—Brian P. Werner
Attorney, Agent, or Firm—Young & Thompson

[57] ABSTRACT

Fingerprint image entry device having no ground electrode provided in a position with which a finger is in a direct contact, wherein accurate fingerprint image can be entered independently of the initial electrostatically charged condition of the finger. The device comprises an electrode which is in the form of mesh or comb for radiating a high frequency wave toward a finger, a plurality of signal sensing electrodes for forming electrostatic capacitance between the electrodes and the finger and a signal switching means for consecutively connecting each of these signal sensing electrodes to a signal sensing circuit.

20 Claims, 8 Drawing Sheets

11 DIELECTRIC SUBSTRATE
12 SIGNAL GENERATING ELECTRODE
13 SIGNAL DETECTING ELECTRODE
16 FIRST DIELECTRIC LAYER
17 SECOND DIELECTRIC LAYER
20 THIN FILM TRANSISTOR

| 10 | SIGNAL GENERATING AND SENSING SUBSTRATE |
| --- | --- |
| 11 | DIELECTRIC SUBSTRATE |
| 12 | SIGNAL GENERATING ELECTRODE |
| 13 | SIGNAL DETECTING ELECTRODE |
| 14 | LEAD FOR GATE ELECTRODE |
| 15 | LEAD FOR DRAIN ELECTRODE |
| 16 | FIRST DIELECTRIC LAYER |
| 17 | SECOND DIELECTRIC LAYER |
| 20 | THIN FILM TRANSISTOR |
| 30 | HIGH FREQUENCY SIGNAL GENERATING SOURCE |
| 40 | SHIFT REGISTER CIRCUIT |
| 50 | SIGNAL SENSING CIRCUIT |

12  SIGNAL GENERATING ELECTRODE
13  SIGNAL DETECTING ELECTRODE
14  LEAD FOR GATE ELECTRODE
15  LEAD FOR DRAIN ELECTRODE
20  THIN FILM TRANSISTOR
30  HIGH FREQUENCY SIGNAL GENERATING SOURCE
40  SHIFT REGISTER CIRCUIT
50  SIGNAL SENSING CIRCUIT

11 DIELECTRIC SUBSTRATE
12 SIGNAL GENERATING ELECTRODE
13 SIGNAL DETECTING ELECTRODE
16 FIRST DIELECTRIC LAYER
17 SECOND DIELECTRIC LAYER
20 THIN FILM TRANSISTOR

| 13 | SIGNAL DETECTING ELECTRODE |
| --- | --- |
| 14 | LEAD FOR GATE ELECTRODE |
| 15 | LEAD FOR DRAIN ELECTRODE |
| 16 | FIRST DIELECTRIC LAYER |
| 17 | SECOND DIELECTRIC LAYER |
| 20 | THIN FILM TRANSISTOR |
| 24 | SIGNAL GENERATING ELECTRODE |
| 30 | HIGH FREQUENCY SIGNAL GENERATING SOURCE |
| 40 | SHIFT REGISTER CIRCUIT |
| 50 | SIGNAL SENSING CIRCUIT |

14  LEAD FOR GATE ELECTRODE
15  LEAD FOR DRAIN ELECTRODE
20  THIN FILM TRANSISTOR
22  SIGNAL GENERATING ELECTRODE
23  SIGNAL GENERATING ELECTRODE
30  HIGH FREQUENCY SIGNAL GENERATING SOURCE
40  SHIFT REGISTER CIRCUIT
50  SIGNAL SENSING CIRCUIT

13   SIGNAL DETECTING ELECTRODE
14   LEAD FOR GATE ELECTRODE
15   LEAD FOR DRAIN ELECTRODE
20   THIN FILM TRANSISTOR
25   SIGNAL GENERATING ELECTRODE
30   HIGH FREQUENCY SIGNAL GENERATING SOURCE
40   SHIFT REGISTER CIRCUIT
50   SIGNAL SENSING CIRCUIT

13  SIGNAL DETECTING ELECTRODE
14  LEAD FOR GATE ELECTRODE
15  LEAD FOR DRAIN ELECTRODE
20  THIN FILM TRANSISTOR
26  LEAD FOR GATE ELECTRODE AND SIGNAL GENERATING ELECTRODE
41  SHIFT REGISTER CIRCUIT
50  SIGNAL SENSING CIRCUIT

111 SUBSTRATE
112 ELECTRODE
113 SWITCHING ELEMENT
114 Y LEAD
115 X LEAD
116 ELECTROSTATIC CAPACITANCE SENSING CIRCUIT
117 DRIVE CIRCUIT
121 PARASITIC CAPACITANCE BETWEEN LEAD AND ELECTRODE
122 ELECTROSTATIC CAPACITANCE BETWEEN RIDGE LINE AND ELECTRODE
123 ELECTROSTATIC CAPACITANCE BETWEEN VALLEY LINE AND ELECTRODE

FINGERPRINT IMAGE ENTRY DEVICE OF ELECTROSTATIC CAPACITANCE SENSING TYPE

FIELD OF THE INVENTION

The present invention relates to an electrostatic capacitance coupling type fingerprint image entry device.

BACKGROUND OF THE INVENTION

The electrostatic capacitance sensing type fingerprint image input device is known from, for example, JP Patent Kokai Publication JP-A-8-305832. FIG. 8 is a perspective view showing the configuration of the electrostatic capacitance sensing type fingerprint image entry device which is disclosed in the cited JP Patent Kokai Publication JP-A-8-305832.

Referring now to FIG. 8, this fingerprint entry device comprises a substrate 111 and a multiplicity of electrodes 112 and switching elements 113, which are two-dimensionally arrayed on the substrate 111. The electrodes 112 and switching elements 113 are connected to an electrostatic capacitive sensing circuit 116 and drive circuit 117 via Y leads 114 and X leads 115, respectively.

Now, operation of the prior art fingerprint image entry device which is shown in FIG. 8 will be described. When a finger F is brought closer to the substrate 111, electrostatic capacitances 122 and 123, etc. are formed between the finger F and the electrodes 112. Since the capacitance reflects information on the ridges and valleys of the finger, an image of the fingerprint can be obtained by sensing the capacitance. Sensing of the capacitance 122, 123, etc. between the finger F and the electrodes 112 is conducted as follows.

Firstly, all the parasitic capacitances 121 of the X leads 115 are precharged to a given potential, followed by turning off one of the Y leads 114.

Subsequently, the electrostatic charge is distributed between the capacitance 122 and the capacitance 121 by turning on this Y lead 114. The capacitance is determined by sensing the change in the potential on the X lead 115 at this time.

This operation will be conducted for all Y leads so that the distribution of the electrostatic capacitance between the finger F and each of electrodes 112, that is, a fingerprint image is obtained.

SUMMARY OF THE DISCLOSURE

However, the above-mentioned prior art fingerprint image entry device has a problem that it is very hard to conduct accurate capacitance sensing. The reason is as follows:

In the above-mentioned prior art fingerprint image entry device, the change in the potential on the X leads 115 when the electrostatic charge is distributed between the capacitance 112 and the parasitic capacitance 121 depends upon the initial electrostatically charged condition of the finger. Since the electrostatically charged condition of the finger may vary, it is practically hard to conduct accurate capacitance sensing.

In order to overcome this problem, it might be envisaged that a grounding electrode be provided in a position to which a finger is directly contacted. In this case, it is hard to protect the grounding electrode from being damaged, resulting in a difficulty to maintain reliability and safety of the device for an extended period of time.

Therefore, the present invention was made in view of the above-mentioned problems. It is an object of the invention to provide a fingerprint image entry device in which no grounding electrode is provided in a position to which a finger is directly contacted and accurate fingerprint image can be entered without depending upon the initial electrostatically charged condition of the finger.

Further objects of the present invention will become apparent in the entire disclosure.

In order to achieve the object, there is provided a novel fingerprint image entry device according to a first aspect of the present invention. The device generally comprises a substrate having a surface with which a finger can be brought into contact via a protective layer; a plurality of first electrodes which are two-dimensionally arrayed on said surface; and a plurality of switching elements, each being provided correspondingly to one of said first electrodes, so that a fingerprint image is obtained by sensing the electrostatic capacitance formed between the finger and each of the first electrodes. It is characterized in that the device comprises a second electrode which is formed in the form of mesh or comb on the surface; signal generating means (circuit) which is connected to the second electrode; and means for controlling the switching elements to consecutively bring the switching elements conductive for electrically connecting the first electrodes to signal sensing means (circuit).

According to a second aspect of the present invention, a fingerprint image entry device generally comprises a substrate having a surface with which a finger can be brought into contact via a protective layer; a plurality of first electrodes which are two-dimensionally arrayed on the surface; and a plurality of switching elements, each being provided correspondingly to one of the first electrodes, so that a fingerprint image is obtained by sensing the electrostatic capacitance formed between the finger and each of the first electrodes. It is characterized in that the device comprises a second electrode which is formed in the form of a mesh or comb on the surface; signal sensing means (circuit) which is connected to the second electrode; and means for controlling the switching elements to consecutively bring the switching elements conductive for electrically connecting high frequency signal generating means (circuit) to the first electrode.

According to a third aspect of the present invention, a fingerprint image entry device comprises a substrate having a surface with which a finger can be brought into contact via a protective layer; a plurality of first electrodes which are two-dimensionally arrayed on the surface; and a plurality of switching elements, one being provided correspondingly to each of the first electrodes, so that a fingerprint image is obtained by sensing the electrostatic capacitance formed between the finger and each of the first electrodes. It is characterized in that the device comprises a plurality of electrodes which are formed in strips on the surface; second switching elements, each for one of the second electrodes; and means for controlling the first and second switching elements to electrically connected high frequency signal generating means to the second electrodes by consecutively bringing the second switching elements conductive and to electrically connect signal sensing means to the first electrodes by consecutively bringing the first switching elements.

According to a fourth aspect of the present invention, a fingerprint image entry device generally comprises a substrate having a surface with which a finger can be brought into contact via a protective layer; a plurality of first electrodes which are two-dimensionally arrayed on the surface;

and a plurality of switching elements, each being provided correspondingly to one of the first electrodes, so that a fingerprint image is obtained by sensing the electrostatic capacitance formed between the finger and each of the first electrodes. It is characterized in that the device comprises a plurality of second electrodes which are formed in strips on the surface and are connected to the switching elements for controlling the conductive state of the switching elements; means for applying a voltage, having a plurality of output terminals for consecutively applying a voltage to the plurality of second electrodes; and means for sensing a signal which is connected to the first electrodes via the switching elements, wherein outputs of the neighboring two output terminals of the voltage applying means are set to be simultaneously active for a given period of time.

The first aspect of the present invention includes an electrode for radiating a high frequency signal toward a finger, which is in the form of mesh or comb, a plurality of signal sensing electrodes for forming electrostatic capacitance between these electrodes and a finger, and signal switching means for consecutively connecting these signal sensing electrodes to a signal sensing circuits.

The second aspect of the present invention includes a plurality of signal generating electrodes forming electrostatic capacitances between these electrodes and a finger, signal switching means for consecutively connecting these signal generating electrodes to high frequency signal generating means, an electrode for sensing a high frequency signal which is transmitted via the electrostatic capacitance, which is in the form of mesh or comb, and signal sensing means.

The third aspect of the present invention includes a plurality of electrodes for radiating a high frequency signal to a finger, which are in the form of strips (or stripes), signal switching means for consecutively connecting these signal generating electrodes to high frequency signal generating means, a plurality of signal sensing electrodes for forming electrostatic capacitances between the electrodes and a finger, and signal switching means for consecutively connecting the signal sensing electrodes to a signal sensing circuit.

The fourth aspect of the present invention includes a plurality of signal generating electrodes for radiating a rectangular wave to a finger, which are connected via switching elements to a multiplicity of signal detecting electrodes for forming electrostatic capacitances between the electrodes and a finger, control means for controlling the conductive state of these switching elements and signal switching means for consecutively connecting these signal sensing electrodes to a signal sensing circuit, wherein the output of the neighboring two output terminals of the control means are simultaneously set to a high level for predetermined period of time.

PREFERRED EMBODIMENTS

Figure 1:
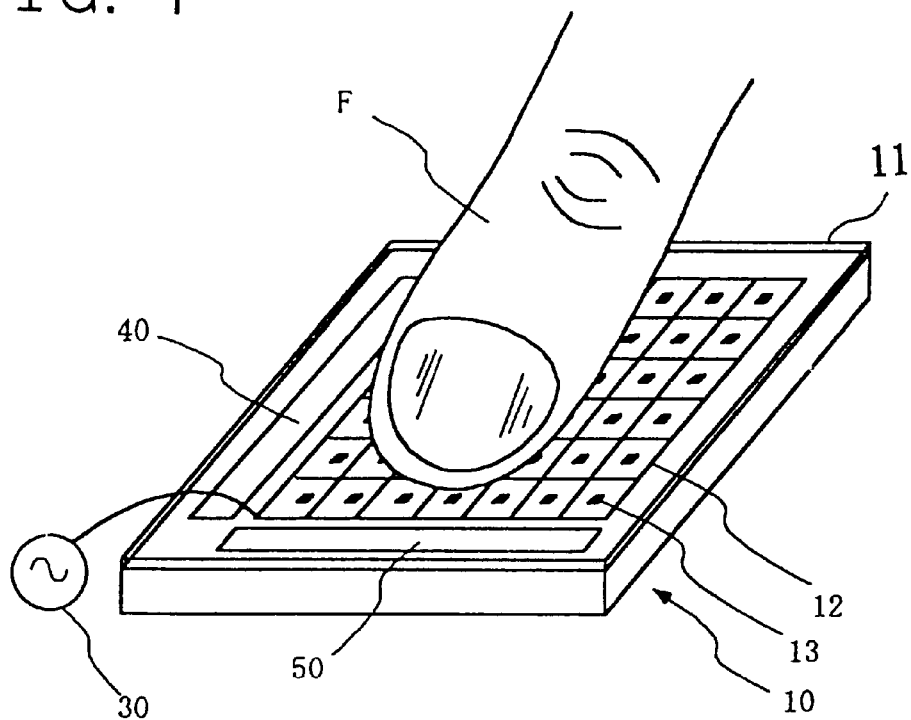
FIG. 1 is a perspective view showing a first embodiment of the fingerprint image entry device of the present invention.

Modes of embodying the present invention will now be described. In a preferred mode of embodying the present invention, the fingerprint image entry device comprises following elements:

(a) a substrate having a surface on which a plurality of scanning signal leads (leads for gate electrodes 14 in FIG. 2) and signal sensing leads (leads for drain electrodes 15 in FIG. 2) are disposed so that they intersect each other at right angles;

(b) switching elements (20 in FIG. 2) and signal sensing electrodes (13 in FIG. 13) in an area in which the scanning signal leads intersect the signal sensing leads; the switching elements (20 in FIG. 2) being connected between the signal sensing electrodes and the signal sensing leads, the gate terminals for the switching elements being connected to the scanning signal leads (leads for gate electrodes 14 in FIG. 2) to define sensing units in the area, the sensing units being two-dimensionally arrayed in a matrix form;

(c) a signal generating electrode (12 in FIG. 2) having openings, each surrounding the periphery of one of the signal sensing elements;

(d) means (shift register 40 in FIG. 2) for consecutively making the plurality of scanning signal leads active to consecutively bring the switching elements into a conductive state; and (e) signal sensing circuit (50 in FIG. 2) which is connected to the signal sensing leads;

(f) wherein the signal sensing electrodes (13 in FIG. 2) in the row in which the scanning signal leads (leads for gate electrodes 14 in FIG. 2) are made active are electrically connected to the signal sensing means (50 in FIG. 2) via signal sensing leads (lead for drain electrodes 15 in FIG. 2) for applying a high frequency signal to the signal generating electrode (12 in FIG. 2) from a high frequency signal generator (30 in FIG. 2) to provide information on the terrain (profile) of the finger in each row.

In this form of the invention, the signal generating electrode (24 in FIG. 4) may be in the form of comb-like plane extending along the sensing units of each row.

Figure 5:
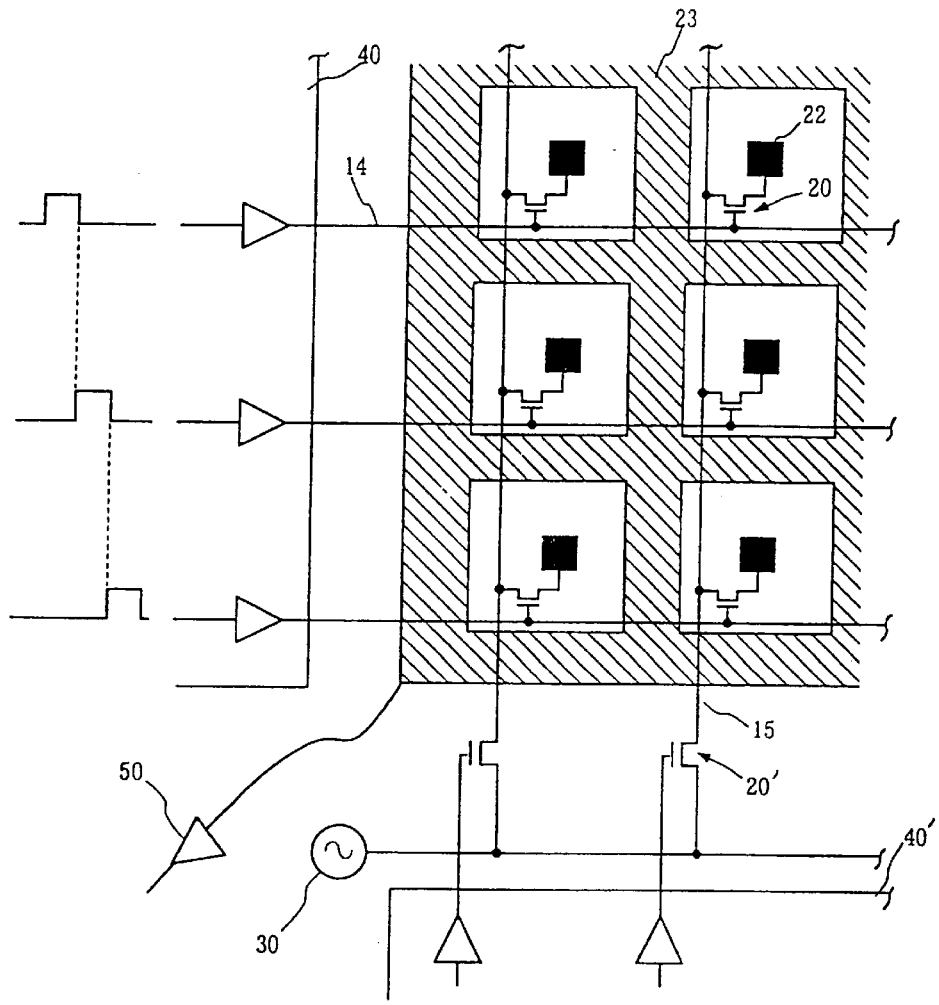
FIG. 5 is an explanatory view showing the configuration of the second embodiment of the fingerprint image entry device of the present invention.

In another preferred mode of embodying the present invention, the fingerprint image entry device comprises a substrate having a surface on which a plurality of scanning signal leads (leads for gate electrode 14 in FIG. 5) and signal supplying leads (leads for drain electrodes 14 in FIG. 5) are disposed so that they intersect each other at right angles;

Switching elements (20 in FIG. 5) and signal generating electrodes (22 in FIG. 5) are arranged around or in an area in which the scanning signal leads intersect the signal supplying leads; the switching elements being connected between the signal generating electrodes and the signal supplying leads, the gate terminals for the switching elements being connected to the scanning signal leads (leads for gate electrodes 14 in FIG. 2) to define sensing units for the area, the sensing units being two-dimensionally arrayed in a matrix form;

A signal sensing electrode is provided (22 in FIG. 5) having openings, each surrounding the periphery of one of the signal generating electrodes;

There is means (shift register 40 in FIG. 5) for consecutively making the plurality of scanning signal leads (leads for gate electrodes 14 in FIG. 15) active to consecutively bring the switching elements in each row into a conductive state;

Also there is means (second shift register 40' in FIG. 5, second switching elements 20') for consecutively and electrically connecting the plurality of signal supply leads (leads for drain electrodes 14 in FIG. 5) to a high frequency signal generating source (30 in FIG. 5);

Further there is signal sensing means (or circuit 50 in FIG. 5) which is connected to the signal sensing electrodes (23 in FIG. 5), wherein a high frequency signal is applied from a high frequency signal source (30 in FIG. 5) via the signal supplying leads (leads for drain electrodes 14 in FIG. 5) in each consecutively selected column to each of the signal generating electrodes 22 in FIG. 5) in a row in which the scanning signal lead (lead for gate electrode 14 in FIG. 5) is made active, so that information on the terrain (profile) of the finger in the each row and column is obtained through the signal sensing electrodes (23 in FIG. 5) and signal sensing means (50 in FIG. 5).

Figure 6:
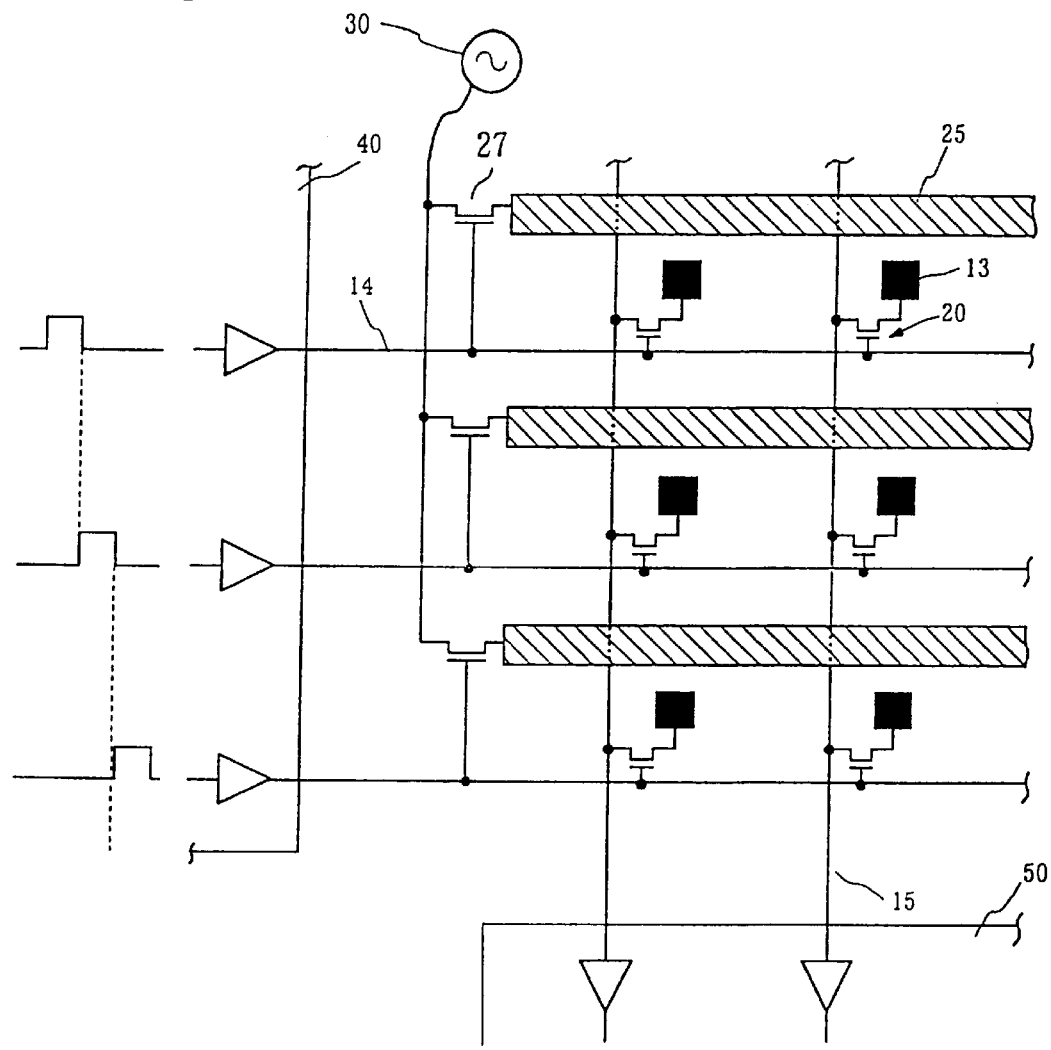
FIG. 6 is an explanatory view showing the configuration of the third embodiment of the fingerprint image entry device of the present invention.

In a further preferred mode of the present invention, the fingerprint image entry device comprises a substrate having a surface on which a plurality of signal scanning signal leads (leads for gate electrodes 14 in FIG. 6) and signal sensing leads (leads for drain electrodes in FIG. 6) are disposed so that they intersect each other at right angles;

There are switching elements (20 in FIG. 6) and signal sensing electrodes (13 in FIG. 6) in or around an area in which the scanning signal leads intersect the signal sensing leads; the switching elements being connected between the signal sensing electrodes and the signal sensing leads, the gate electrodes for the switching elements being connected to the scanning signal leads to define sensing units in the area, the sensing units being two-dimensionally arrayed in a matrix form;

There are signal generating electrodes (25 in FIG. 6) each being disposed along each row of a plurality of the signal sensing electrodes (13 in FIG. 6);

There is means (shift register 40 in FIG. 6) for consecutively making the plurality of scanning signal leads active to consecutively bring the switching elements in each row into a conductive state;

The signal sensing means (60 in FIG. 6) is connected to the signal sensing leads;

There are means for consecutively and electrically connecting the plurality of signal generating electrodes (25 in FIG. 6) to a high frequency signal generating source (30 in FIG. 6) when the scanning signal leads (leads for gate electrodes 14 in FIG. 6) are made active; wherein the signal sensing electrodes (13 in FIG. 6) in the row in which the scanning signal leads are made active are electrically connected to the signal sensing means (50 in FIG. 6) via the signal sensing leads (leads for drain electrodes 14 in FIG. 6) for applying a high frequency signal to the signal generating electrode (25 in FIG. 6) to provide information on the terrain (profile) of the finger in each row.

In a further preferred mode of the present invention, the fingerprint image entry device comprises a substrate having a surface on which a plurality of scanning signal leads (leads for gate electrodes 14 in FIG. 7) and signal sensing leads (leads for drain electrodes 15 in FIG. 7) are disposed so that they intersect each other at right angles;

There are switching elements (20 in FIG. 7) and signal sensing electrodes (13 in FIG. 7) in or around an area in which the scanning signal leads intersect the signal sensing leads; the switching elements being connected between the signal sensing electrodes and the signal sensing leads, the control terminals (gate electrodes) for the switching elements being connected to the scanning signal leads (leads for gate electrodes 14 in FIG. 7) to define sensing units for the area, the sensing units being two-dimensionally arrayed in a matrix form;

There are signal generating electrodes (26 in FIG. 7) disposed along the plurality of signal detecting electrodes, the signal generating electrodes being also used as the scanning signal leads (leads for gate electrodes in FIG. 17); signal sensing means (50 in FIG. 7) which is connected to the signal sensing leads (leads for drain electrodes 15 in FIG. 7); and means (41 in FIG. 7) for consecutively making the signal generating electrodes serving as the scanning signal leads in each row to generate signals having an active duration which overlaps in adjacent rows.

DETAILED DESCRIPTION OF THE PREFERRED EMBODIMENTS

The foregoing embodiments of the present invention will now be described in more detail with reference to drawings.

[Embodiment 1]

Figure 2:
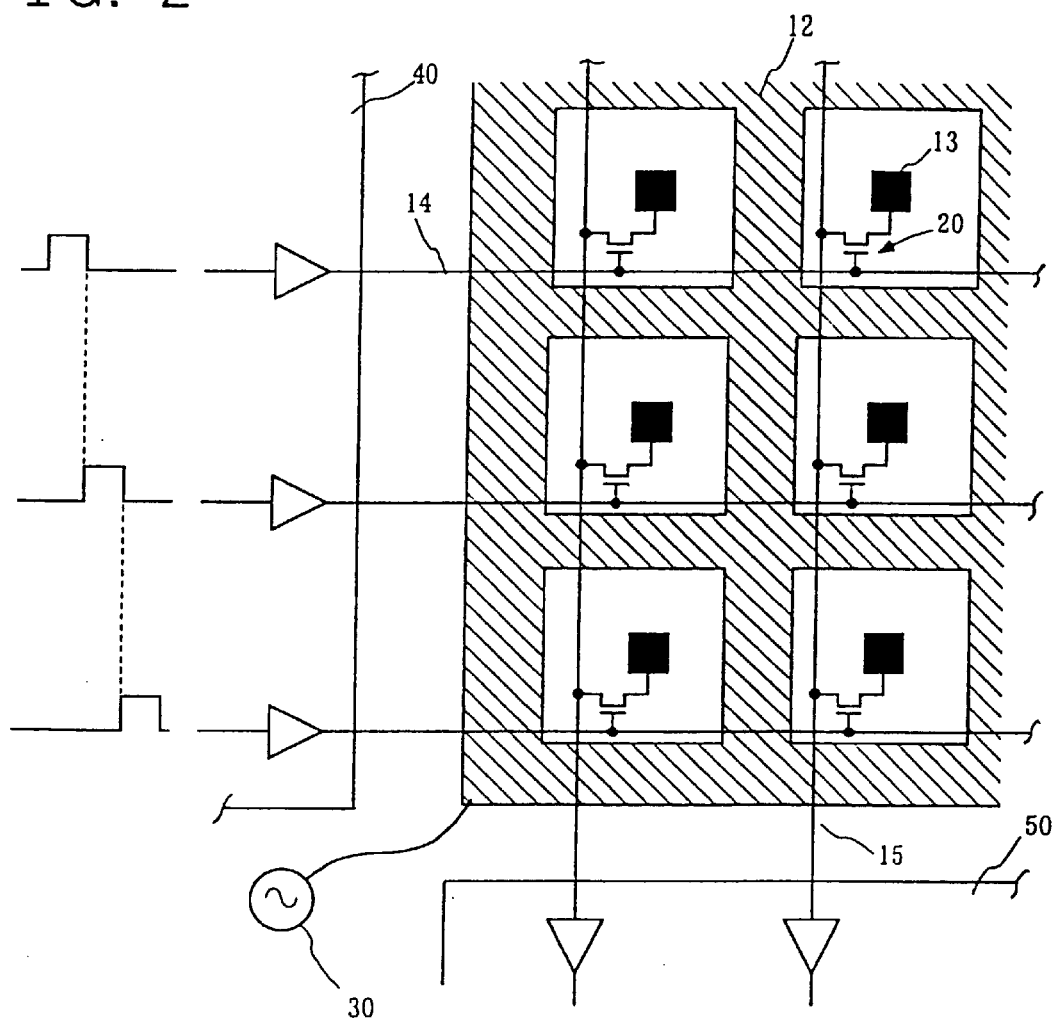
FIG. 2 is an explanatory view showing the configuration of the first embodiment of the fingerprint image entry device of the present invention.
Figure 3:
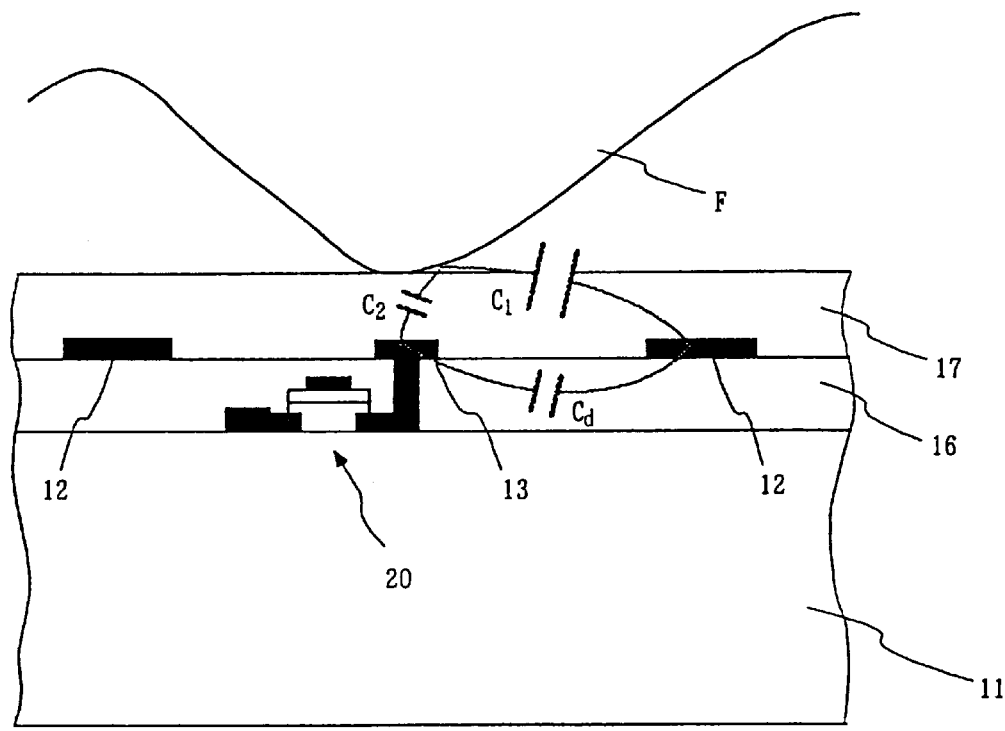
FIG. 3 is an explanatory view for explaining the operation of the first embodiment of the fingerprint image entry device of the present invention.

FIG. 1 is a perspective view showing a first embodiment of a fingerprint image entry device of the present invention. Referring now to FIG. 1, the fingerprint image entry device comprises a signal generating and detecting substrate 10 having a dielectric substrate 11 on which a signal generating electrode 12, a shift register circuit 40, and a signal sensing circuit 50 and the like are formed; and a high frequency signal generating source 30 which is connected to the signal generating electrode 12. FIG. 2 is an explanatory view schematically showing the configuration of the embodiment. FIG. 3 is an explanatory view explaining the configuration and operation of the embodiment.

As shown in FIGS. 2 and 3, the signal generating and sensing substrate 10 comprises a plurality of thin film transistors which are two-dimensionally arrayed on the dielectric substrate 11, a first dielectric layer 16 formed on the substrate 11; signal sensing electrodes 13 formed on the dielectric layer 16, and are connected to source electrodes 13 of the thin film transistors 20; a signal generating electrode 12 which is formed in the form of mesh in an area excepting the signal detecting electrodes 13; and a second dielectric layer 17 which is formed on the electrode 12.

The thin film transistors 20 which are two-dimensionally arrayed have gate electrodes, all of which in the same row are connected to one of gate electrode leads 14, which is in turn connected to each of output terminals of the shift register circuit 40.

All of the drain electrodes in the same column are connected to one of drain electrode leads 15, which is in turn connected to each of input terminals of a signal detecting circuit 50.

Referring now to FIGS. 1 to 3, operation of the embodiment of the present invention will be described. When a fingerprint is input, an area of a finger to be input is brought into contact with the surface of the signal generating and sensing substrate 10.

Each signal detecting electrode 13 in the first row is electrically connected to the corresponding lead 15 by turning the first output of the shift register circuit 40 on (high level). When a high frequency signal is applied to the signal generating electrode 12 by means of the high frequency signal generator 30, electrostatic charge is built up on the signal sensing electrode 13 via three electrostatic capacitors C1, C2 and Cd which are shown in FIG. 3.

The electrostatic capacitors C1, C2 and Cd denote those which are formed between the signal generating electrode 12 and the finger F; the finger F and the signal sensing electrode 13; and the signal generating electrode 12 and the signal sensing electrode 13.

If these components are designed so that C1>>C2, the amount of the charge stored in the signal sensing electrode 13 would be substantially proportional to C2. Since C2 is determined by the terrain (profile) of a finger which is adjacent to the signal sensing electrode 13, the output of the signal sensing circuit 50 reflects information on the terrain of the finger in the first row, that is, information on the ridge or valley lines of the finger.

After the information on the fingerprint in the first row has been externally recorded, similar operation is repeated for the thin film transistors in the second and subsequent rows so that a fingerprint image is obtained.

Although the embodiment in which thin film transistors 20 are formed on the dielectric substrate 11 has been described, similar effect can be obtained even by means of the configuration in which switching elements are two-dimensionally arrayed on a dielectric layer which is formed on a silicon substrate.

A high frequency signal is applied on the signal generating electrode 12 in the above-mentioned embodiment. The present invention does not restrict the waveform of a signal to be applied to the signal generating electrode. For example, a rectangular waveform signal may be used.

Although the signal switching means for connecting any of the plurality of signal sensing electrodes to the signal sensing circuit in a time-sharing basis comprises the shift register circuit and a plurality of arrayed thin film transistors in the foregoing embodiment, the thin film transistors may be replaced with back-to-back diodes. The type of the thin film transistor may be of various types such as staggered type, inverted staggered type, self-alignment type as well as the plain type.

Although the electrode which is in the form of mesh is used as the signal generating electrode 12 in the foregoing embodiment, the signal electrode of the present invention is not limited to this form.

Figure 4:
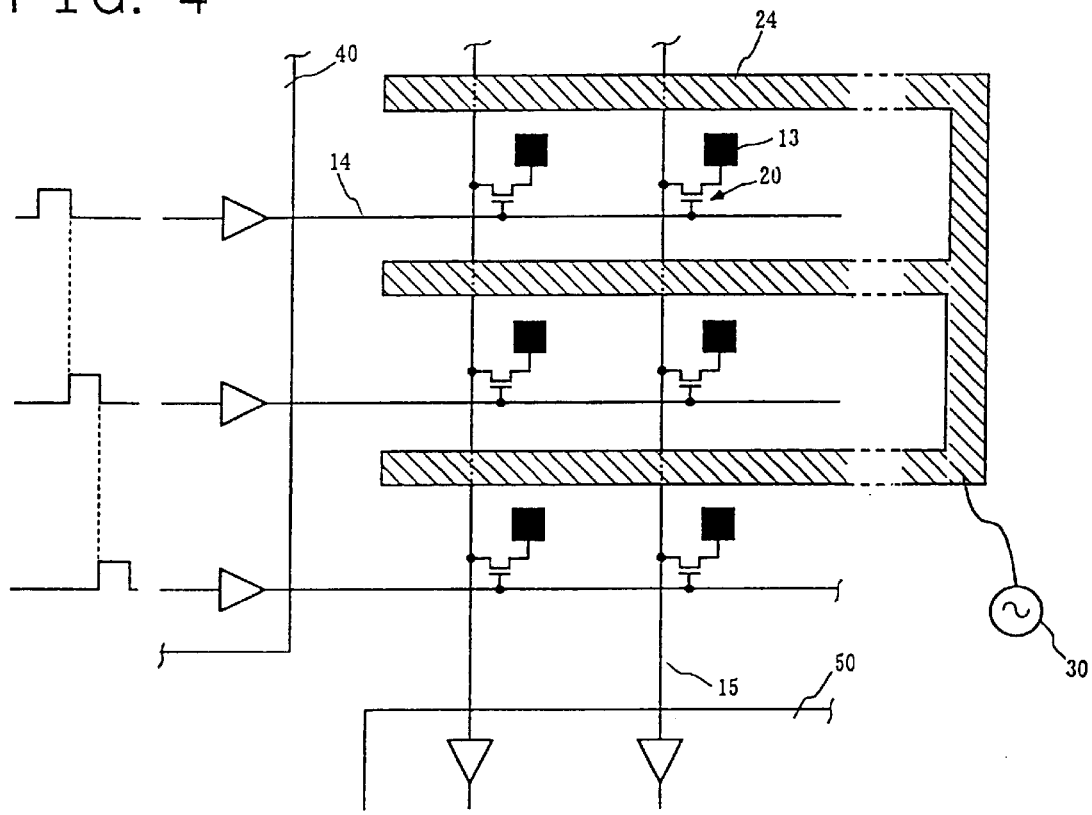
FIG. 4 is an explanatory view for explaining a variation of the first embodiment of the fingerprint image entry device of the present invention.

FIG. 4 is a plan view showing a variation of the first embodiment of the present invention. Similar effect could be obtained even if a comb like electrode 24 is formed as the signal generating electrode which is connected to the high frequency signal generating source 30 as shown in FIG. 4.

Since transferring (entering or sharing) of electrostatic charge is sensed in the foregoing embodiment, accurate sensing of the electrostatic capacitance can be conducted without being influenced by the charging condition of the finger. Accordingly, entry of the fingerprint image having a high quality can be enabled. Since it is not necessary to provide electrodes in positions where the finger is brought into contact with, the electrodes can be covered with a protective layer, resulting in a high reliability.

[Embodiment 2]

FIG. 5 is an explanatory view showing the configuration of a second embodiment of the fingerprint image entry device of the present invention. In FIG. 5, the components which are like to those in FIG. 2 are represented by like reference numerals. Although the fingerprint image entry device comprises one signal generating electrode and a plurality of signal sensing electrodes in the foregoing first embodiment, the functions of these electrodes are exchanged with each other in the second embodiment of the present invention so that the fingerprint image entry device comprises one signal sensing electrode and a plurality of signal generating electrode.

Referring now to FIG. 5, the fingerprint image entry device of the second embodiment of the present invention comprises a plurality of thin film transistors 20 which are two-dimensionally arrayed, signal generating electrodes 22, a bank of leads 14 for connecting the gate electrodes of the thin film transistors to a first shift register circuit 40, a bank of leads 15 for connecting the drain electrodes of the thin film transistors 20 to each other and for connecting the drain electrodes to a high frequency signal generating source 30 via second thin film transistors 20', a second shift register circuit 40' for sequentially turning-on the gate electrodes of the second thin film transistors 20, a signal sensing electrode 23 which is uniformly formed in the form of mesh, and a signal sensing circuit 50 which is connected to the signal sensing electrode 23.

Now, operation of the second embodiment of the present invention will be described.

The thin film transistors 20 which are connected to all of the signal generating electrodes 22 in the first row are turned on by setting the output voltage of the first shift register circuit 40 in the first row to a high level. When the voltage of the lead 15 in the first column is set to a high level by means of the second shift register circuit 40', only the signal generating electrode 22 in the first column is electrically connected to the high frequency signal generating source 30 in the first row. The information on the valleys and ridges of the finger which is adjacent to the signal generating electrode 22 in the first row and column is obtained by sensing a signal which is applied to the signal sensing electrode 23.

Subsequently, similar operation is conducted for the second column so that information on the valleys and ridges of the finger which is adjacent to the signal generating electrode 22 in the first row and second column is obtained. After information on the valleys and ridges of the finger which is adjacent to all the signal generating electrodes 22 in the first row is obtained. The whole of fingerprint image is obtained by repeating such operation for the second row and so on.

[Embodiment 3]

FIG. 6 is an explanatory view showing the configuration of a third embodiment of the fingerprint image entry device of the present invention. In FIG. 6, the components which are like to those in FIG. 2 are represented by like reference numerals. Referring now to FIG. 6, the third embodiment of the present invention is substantially identical with the first embodiment except that the signal generating electrode 25 is divided into a plurality of elongated rectangular strips and that each signal generating electrode 25 is electrically connected to the signal generating source 30 in the same timing relationship as that the voltage of the lead 14 for the gate electrode in the same row is set to a high level by means of the shift register circuit 40.

Now, operation of the third embodiment of the present invention will be described.

When the output voltage of the shift register circuit 40 in the first row is set to a high level, a switching element 27 becomes conductive so that only the signal generating electrode 25 in the first row is electrically connected to a high frequency signal generating source 30. Simultaneously with this, the thin film transistors 20 in the first row are brought into a conductive state so that all the signal generating electrodes 13 in the first row are connected to the respectively corresponding input terminals of the signal sensing circuit 50. The signals which are individually applied to all the signal sensing electrodes 13 in the first row are sensed so that information on the ridges and valleys of the finger which are adjacent to the signal sensing electrodes 13 in the first row is obtained.

Subsequently, similar operation is conducted for the second row and so on so that information on the ridges and valleys of the finger which are adjacent to the signal sensing electrodes in respective rows is obtained. This provides an image of the fingerprint.

[Embodiment 4]

Figure 7:
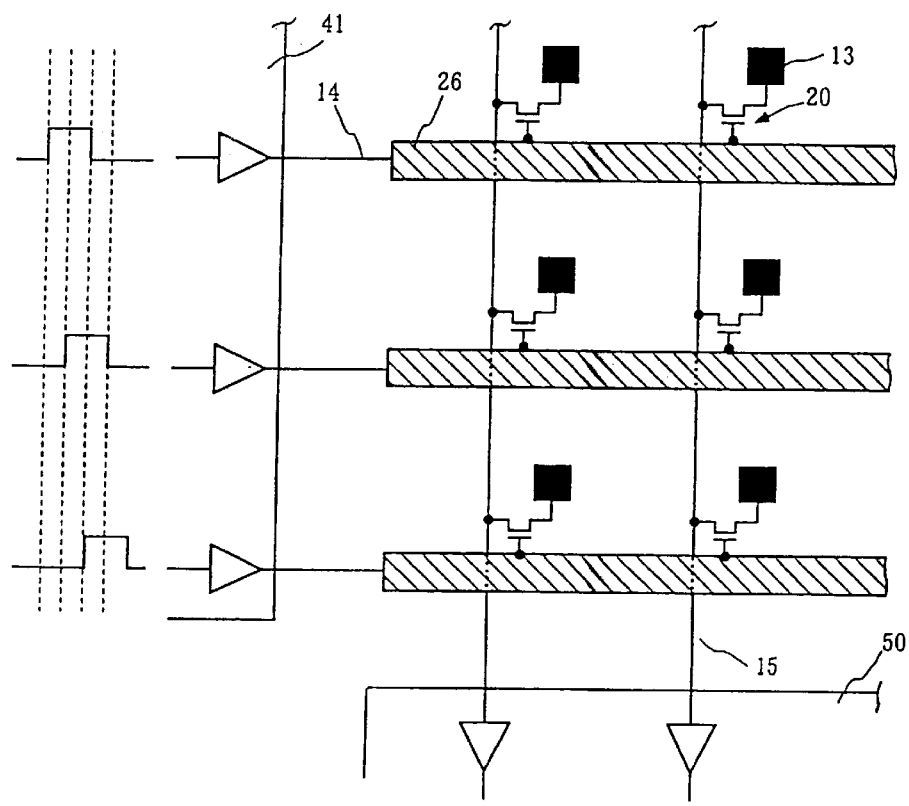
FIG. 7 is an explanatory view showing the configuration of the fourth embodiment of the fingerprint image entry device of the present invention.
Figure 8:
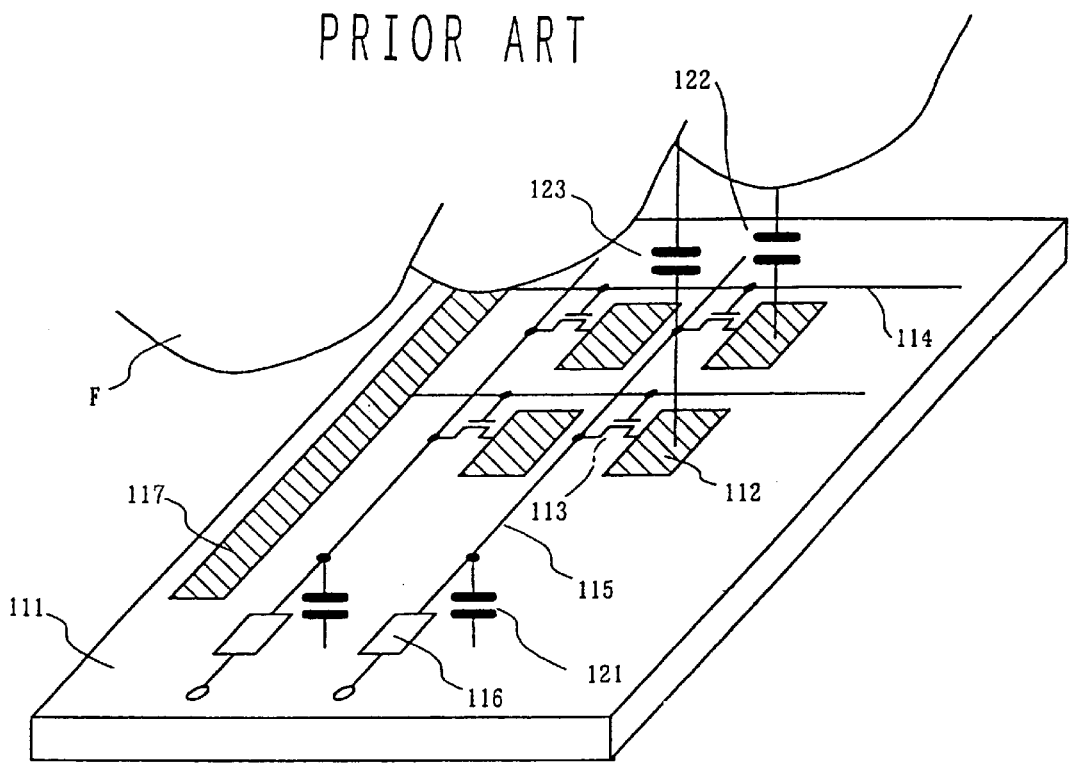
FIG. 8 is a perspective view showing the configuration of a prior art electrostatic capacitance sensing type fingerprint image entry device.

FIG. 7 is an explanatory view showing the configuration of a fourth embodiment of the fingerprint image entry device of the present invention. In FIG. 7, the components which are like to those in FIG. 2 are represented by like reference numerals. Referring now to FIG. 7, the fourth embodiment of the present invention is substantially identical with the third embodiment except that the divided signal generating electrodes 26 perform the function of the leads for the gate electrodes of the thin film transistors 20 and the output signals on the adjacent terminals of the shift register circuit 41 have waveforms which overlap with each other along the time axis (the periods in which the signals are in a high level overlap to each other).

Now, operation of the fourth embodiment of the present invention will be described.

When the output voltage of the shift register circuit 41 in the first row is set to a high level, the thin film transistors 20 become conductive so that all the signal sensing electrodes 13 in the first row are electrically connected to the corresponding input terminal of the signal sensing circuit 50.

When the output voltage of the shift register circuit 41 in the second row is set to a high level, electrostatic charge is charged on the signal sensing electrodes 13 in the first row from the signal generating electrode 26 in this second row. In such a manner, information on the valleys and ridges of the finger which are adjacent to the signal sensing electrodes 13 in the first row is obtained by sequentially detecting each signal which is individually applied to all the signal detecting electrodes in the first row through the second shift register circuit 50. Similar operation is conducted for the second and third rows to obtain information on the valleys and ridges of the finger which are adjacent to the signal detecting electrode 13 in the second row. An image of the fingerprint can be obtained by inputting information on the valleys and ridges of the fingers in the fourth and subsequent rows.

In summary, the present invention exhibits significant effects. As mentioned above, in accordance with the present invention, there are provided meritorious effects as follows.

A first effect resides in that accurate sensing of electrostatic capacitance can be achieved without being influenced by the electrostatic charge on the finger so that entry of a fingerprint image having a high quality can be performed since application of the charge, i.e., applied charge is sensed in the present invention.

A second effect resides in that a reliable device having a surface which is covered with a protective layer can be obtained since it is not necessary to provide an electrode with which the finger is brought into contact.

It should be noted that modification obvious in the art may be done without departing the gist and scope of the present invention as disclosed herein and claimed hereinbelow as appended.

What is claimed is:

1. A fingerprint image entry device comprising
   a substrate having a surface with which a finger can be brought into contact via a protective layer;
   a plurality of first electrodes which are two-dimensionally arrayed on said surface; and
   a plurality of switching elements, each being provided correspondingly to one of said first electrodes, so that a fingerprint image is obtained by sensing the electrostatic capacitance formed between said finger and each of said first electrodes,
   wherein said device comprises
      a second electrode which is formed in the form of mesh or comb on the same surface as said first electrodes;
      a signal generating circuit which is connected to said second electrode; and
      means for controlling said switching elements to consecutively bringing said switching elements conductive for electrically connecting said first electrodes to a signal sensing circuit.

2. A fingerprint image entry device as defined in claim 1, wherein said substrate is formed of a dielectric substrate or crystal silicon wafer.

3. A fingerprint image entry device as defined in claim 1, wherein said switching elements are at least any one selected from the group consisting of transistors formed of thin film semiconductor or crystal silicon and back-to-back diodes.

4. A fingerprint image entry device as defined in claim 3, wherein said signal generating electrode has a shape of comb-teeth extending along said sensing unit in each row.

5. A fingerprint image entry device comprising
   a substrate having a surface with which a finger can be brought into contact via a protective layer;
   a plurality of first electrodes which are two-dimensionally arrayed on said surface; and
   a plurality of switching elements, each being provided correspondingly to one of said first electrodes, so that a fingerprint image is obtained by sensing the electrostatic capacitance formed between said finger and each of said first electrodes,
   wherein said device comprises
      a second electrode which is formed in the form of a mesh or comb on the same surface as said first electrodes;
      a signal sensing circuit which is connected to said second electrode; and
      means for controlling said switching elements to consecutively bring said switching elements conductive for electrically connecting a high frequency signal generating circuit to said first electrode.

6. A fingerprint image entry device as defined in claim 5, wherein said substrate is formed of a dielectric substrate or crystal silicon wafer.

7. A fingerprint image entry device as defined in claim 5, wherein said switching elements are at least any one selected from the group consisting of transistors formed of thin film semiconductor or crystal silicon and back-to-back diodes.

8. A fingerprint image entry device comprising
   a substrate having a surface with which a finger can be brought into contact via a protective layer;
   a plurality of first electrodes which are two-dimensionally arrayed on said surface; and a plurality of switching elements, one being provided correspondingly to each of said first electrodes, so that a fingerprint image is obtained by sensing the electrostatic capacitance formed between said finger and each of said first electrodes, wherein said device comprises:
a plurality of electrodes which are formed in strips on the same surface as said first electrodes;
second switching elements, each for one of said second electrodes; and
means for controlling said first and second switching elements to electrically connect a high frequency signal generating circuit to said second electrodes by consecutively bringing said second switching elements conductive and to electrically connect a signal sensing circuit to said first electrodes by consecutively bringing said first switching elements conductive.

9. A fingerprint image entry device as defined in claim 8, wherein said substrate is formed of a dielectric substrate or crystal silicon wafer.

10. A fingerprint image entry device as defined in claim 8, wherein said switching elements are at least any one selected from the group consisting of transistors formed of thin film semiconductor or crystal silicon and back-to-back diodes.

11. A fingerprint image entry device comprising a substrate having a surface with which a finger can be brought into contact via a protective layer;

a plurality of first electrodes which are two-dimensionally arrayed on said surface; and
a plurality of switching elements, each being provided correspondingly to one of said first electrodes, so that a fingerprint image is obtained by sensing the electrostatic capacitance formed between said finger and each of said first electrodes, wherein said device comprises:
a plurality of second electrodes which are formed in strips on said surface and are connected to said switching elements for controlling the conductive state of said switching elements;
means for applying a voltage, having a plurality of output terminals for consecutively applying a voltage to said plurality of second electrodes; and
a signal sensing circuit which is connected to said first electrodes via said switching elements, wherein outputs of the adjacent two output terminals of said voltage applying means are set to be simultaneously active for a given period of time.

12. A fingerprint image entry device as defined in claim 11, wherein said substrate is formed of a dielectric substrate or crystal silicon wafer.

13. A fingerprint image entry device as defined in claim 11, wherein said switching elements are at least any one selected from the group consisting of transistors formed of thin film semiconductor or crystal silicon and back-to-back diodes.

14. A fingerprint image entry device, wherein said device comprises:

a substrate having a surface on which a plurality of scanning signal leads and signal sensing leads are disposed so that they intersect each other at right angles;
switching elements and signal sensing electrodes in an area in which said scanning signal leads intersect said signal sensing leads; said switching elements being connected between said signal sensing electrodes and said signal sensing leads, control terminals for said switching elements being connected to said scanning signal leads to define sensing units each for said area, said sensing units being two-dimensionally arrayed in a matrix form;
a signal generating electrode having openings, each surrounding the periphery of one of said signal sensing elements where said signal generating electrode is disposed on the same surface as said signal sensing elements;
means for consecutively making said plurality of scanning signal leads active to consecutively bring the switching elements into a conductive state; and
a signal sensing circuit which is connected to said signal sensing leads;
whereby said signal sensing electrodes in the row in which said scanning signal leads are made active are electrically connected to said signal sensing circuit via said signal sensing leads for applying a high frequency signal to said signal generating electrode to provide information on the terrain of the finger in each row.

15. A fingerprint image entry device as defined in claim 14, wherein said substrate is covered on its surface with a protective layer, to which said finger is brought into contact.

16. A fingerprint image entry device, wherein said device comprises:

a substrate having a surface on which a plurality of scanning signal leads and signal supplying leads are disposed so that they intersect each other at right angles;
switching elements and signal generating electrodes in an area in which said scanning signal leads intersect said signal supplying leads; said switching elements being connected between said signal generating electrodes and said signal supplying leads, control terminals for said switching elements being connected to said scanning signal leads to define sensing units each for said area, said sensing units being two-dimensionally arrayed in a matrix form;
a signal sensing electrode having openings, each surrounding the periphery of one of said signal generating electrodes where said signal sensing electrode is disposed on the same surface as said signal generating electrodes;
means for consecutively making said plurality of scanning signal leads active to consecutively bring the switching elements in each row into a conductive state; and
means for consecutively and electrically connecting said plurality of signal supply leads to a high frequency signal generating source; and
a signal sensing circuit which is connected to said signal sensing electrodes;
wherein a high frequency signal is applied via the signal supplying leads in each consecutively selected column to each of said signal generating electrodes in a row in which said scanning signal lead is made active, so that information on the terrain of the finger in said each row and column is obtained through said signal sensing electrodes and said signal sensing circuit.

17. A fingerprint image entry device as defined in claim 16, wherein said substrate is covered on its surface with a protective layer, to which said finger is brought into contact.

18. A fingerprint image entry device, wherein said device comprises:

a substrate having a surface on which a plurality of signal scanning signal leads and signal sensing leads are disposed so that they intersect each other at right angles;

switching elements and signal sensing electrodes in an area in which said scanning signal leads intersect said signal sensing leads; said switching elements being connected between said signal sensing electrodes and said signal sensing leads, control terminals for said switching elements being connected to said scanning signal leads to define sensing units each for said area, said sensing units being two-dimensionally arrayed in a matrix form;

a signal generating electrode which is disposed on the same surface and along a plurality of said signal sensing electrodes in each row;

means for consecutively making said plurality of scanning signal leads active to consecutively bring the switching elements in each row into a conductive state; and a signal sensing circuit which is connected to said signal sensing leads;

means for consecutively and electrically connecting said plurality of signal generating electrodes to a high frequency signal generating circuit when the scanning signal leads are made active;

wherein said signal sensing electrodes in the row in which said scanning signal leads are made active are electrically connected to said signal sensing circuit via the signal sensing leads for applying a high frequency signal to said signal generating electrode to provide information on the terrain of the finger in each row.

19. A fingerprint image entry device as defined in claim 18, wherein said substrate is covered on its surface with a protective layer, to which said finger is brought into contact.

20. A fingerprint image entry device, wherein said device comprises a substrate having a surface on which a plurality of scanning signal scanning leads and signal sensing leads are disposed so that they intersect each other at right angles;

switching elements and signal sensing electrodes in an area in which said scanning signal leads intersect said signal sensing leads; said switching elements being connected between said signal sensing electrodes and said signal sensing leads, the control terminals for said switching elements being connected to said scanning signal leads to define sensing units each for said area, said sensing units being two-dimensionally arrayed in a matrix form;

signal generating electrodes disposed along said plurality of signal sensing electrodes, said signal generating electrodes being also used as said scanning signal leads;

a signal sensing circuit which is connected to said signal sensing leads;

said plurality of signal generating electrodes being also used as said scanning signal leads; and means for consecutively making said signal generating electrodes serving as said scanning signal leads in each row to generate signals having an active duration which overlaps between neighboring rows.

* * * * *